(12) United States Patent
Kawamura

(10) Patent No.: US 10,727,771 B2
(45) Date of Patent: Jul. 28, 2020

(54) MOTOR CONTROL APPARATUS AND METHOD OF CONTROLLING THE SAME

(71) Applicant: CANON KABUSHIKI KAISHA, Tokyo (JP)

(72) Inventor: Koji Kawamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/375,979

(22) Filed: Apr. 5, 2019

(65) Prior Publication Data
US 2019/0319566 A1 Oct. 17, 2019

(30) Foreign Application Priority Data

Apr. 11, 2018 (JP) .................... 2018-076244
Mar. 27, 2019 (JP) .................... 2019-060572

(51) Int. Cl.
*H02P 21/26* (2016.01)
*H02P 21/00* (2016.01)
(Continued)

(52) U.S. Cl.
CPC .......... *H02P 21/26* (2016.02); *H02P 21/0003* (2013.01); *H02P 21/18* (2016.02); *H02P 21/22* (2016.02)

(58) Field of Classification Search
CPC .... H02P 1/00; H02P 1/026; H02P 1/04; H02P 1/16; H02P 1/18; H02P 1/24; H02P 1/26; H02P 1/28; H02P 1/30; H02P 1/42; H02P 1/426; H02P 1/46; H02P 1/52; H02P 3/00; H02P 3/025; H02P 3/18; H02P 4/00; H02P 5/00; H02P 5/60; H02P 6/00; H02P 6/002; H02P 6/005; H02P 6/04; H02P 6/06; H02P 6/08; H02P 6/12; H02P 6/14; H02P 6/20; H02P 6/22; H02P 6/24; H02P 7/00; H02P 7/06; H02P 7/245; H02P 7/29; H02P 8/00; H02P 8/04; H02P 21/0003; H02P 21/0032; H02P 21/0035; H02P 21/0096;
(Continued)

(56) References Cited

U.S. PATENT DOCUMENTS 9,998,048 B2 6/2018 Maeshima
2018/0175765 A1* 6/2018 Ishikawa .................. H02P 6/20

FOREIGN PATENT DOCUMENTS

JP 2015213398 A 11/2015
JP 2016181945 A 10/2016

* cited by examiner

*Primary Examiner* — Antony M Paul
(74) *Attorney, Agent, or Firm* — Rossi, Kimms & McDowell LLP

(57) ABSTRACT

In order to shorten an activation time while realizing stable motor control, a motor control apparatus operable to control a motor is provided. The apparatus controls so as to drive the motor by the forced commutation control in a duration from a start of control of the motor until a first time period elapses, and control so as to drive the motor by the vector control after the first time period has elapsed. In addition, the apparatus controls an execution frequency of a current detection and a rotation speed estimation. The apparatus controls so that a first execution frequency in a second time period after a switch is made from driving by the forced commutation control to driving by the vector control is greater than a second execution frequency in a third time period subsequent to the second time period.

20 Claims, 10 Drawing Sheets

(51) Int. Cl.
*H02P 21/22* (2016.01)
*H02P 21/18* (2016.01)

(58) Field of Classification Search
CPC .......... H02P 21/14; H02P 23/00; H02P 27/00; H02P 27/04; H02P 27/06; G05B 11/28
USPC ..... 318/400.01, 400.02, 700, 701, 721, 779, 318/799, 800, 801, 599, 811
See application file for complete search history.

MOTOR CONTROL APPARATUS AND METHOD OF CONTROLLING THE SAME

BACKGROUND OF THE INVENTION

Field of the Invention

The present invention relates to control of a motor.

Description of the Related Art

In a laser beam printer, a brushless DC motor or the like is used for driving of a photosensitive drum or a transfer belt. Typically, a brushless DC motor has a three-phase (a U phase, a V phase, and a W phase) stator, and the motor is caused to rotate by controlling voltages applied to these phases. At this point, a rotation speed that changes in accordance with a load or the like is detected and fed back to control to realize a stable rotation speed.

Conventionally, the rotation speed is measured using a Hall sensor or the like, but in recent years, a method (sensorless vector control) for estimating rotation speed from current values for the three phases without using a sensor, and then performing vector control has been widely used (for example, Japanese Patent Laid-Open No. 2015-213398). However, to estimate a rotation speed without a sensor, it is necessary for the motor to be rotating at a relatively high rotation speed and for a sufficient induced current to be generated. In view of this, a method (a forced commutation mode) for causing a motor to forcibly rotate in accordance with commutation (an operation for applying a voltage to a respective phase to create a rotating magnetic field) in a period of time from activation to where the rotation speed has increased by a certain degree is in use (for example, Japanese Patent Laid-Open No. 2016-181945). After the motor has reached a relatively high rotation speed, there is a switch from the forced commutation mode to vector control.

However, because forced commutation control is a method for applying voltage by open loop control to each phase of a motor, as a result it has large current consumption, and using it for a long time is not desirable from a viewpoint of power efficiency. Accordingly, at a time of activation, it is desirable to swiftly switch from forced commutation control to SFOC (Sensorless Field Oriented Control) which has good power efficiency. However, there is a problem that immediately after switching from forced commutation control to SFOC, there is typically a large error in a speed estimate, and time is required until a motor speed stably converges.

SUMMARY OF THE INVENTION

According to one aspect of the present invention, a motor control apparatus operable to control a motor, the apparatus comprises: a detection unit configured to detect a current supplied to the motor; an estimation unit configured to estimate a rotation speed of the motor from the current detected by the detection unit; a first driving unit configured to drive the motor by forced commutation control; a second driving unit configured to drive the motor by vector control based on the rotation speed of the motor which is estimated by the estimation unit; a first control unit configured to control so as to drive the motor by the first driving unit in a duration from a start of control of the motor until a first time period elapses, and control so as to drive the motor by the second driving unit after the first time period has elapsed; and a second control unit configured to control an execution frequency of the detection unit and the estimation unit, wherein the second control unit controls so that, regarding an execution frequency of detection by the detection unit and estimation by the estimation unit, a first execution frequency in a second time period after a switch is made from driving by the first driving unit to driving by the second driving unit is greater than a second execution frequency in a third time period subsequent to the second time period.

The present invention provides a technique for shortening activation time while realizing stable motor control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Explanation is given in detail below, with reference to the drawings, of examples of embodiments of the invention. Note, the following embodiments are only examples and are not intended to limit the scope of present invention.

First Embodiment

As a first embodiment of a motor control apparatus according to the present invention, description is given below by taking a motor control apparatus for controlling a three-phase brushless motor as an example.

<Apparatus Configuration>

Figure 1:
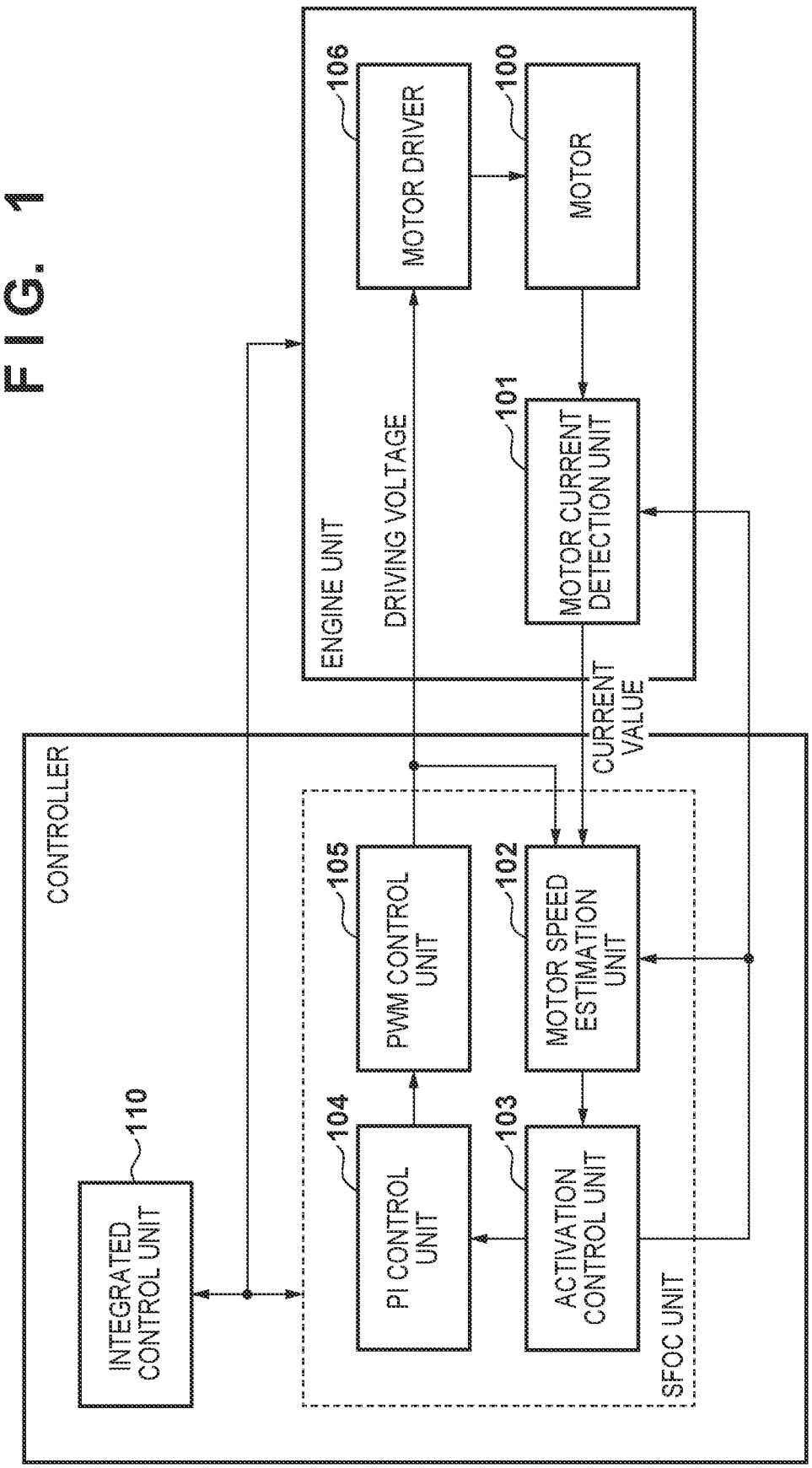
FIG. 1 is a block diagram of a motor control apparatus.

FIG. 1 is a block diagram of a motor control apparatus according to the first embodiment. The motor control apparatus includes a controller and an engine unit.

The engine unit includes a motor 100, a motor driver 106, and a motor current detection unit 101. Here, the motor 100 is a three-phase brushless motor. The motor driver 106 applies a pulse voltage to each coil terminal of the motor 100 to supply current. The motor current detection unit 101 detects a coil current that is supplied to each phase of the motor 100 (here there are three phases (U, V, and W)).

The controller includes an integrated control unit 110 and an SFOC (Sensorless Field Oriented Control) unit. The integrated control unit 110 manages the engine unit and the SFOC unit in an integrated fashion.

The SFOC unit includes a motor speed estimation unit 102, an activation control unit 103, a PI control unit 104, and a PWM control unit 105. The motor speed estimation unit 102 estimates an electrical angle or a rotation speed of the motor from two input values: "three-phase current values" detected by the motor current detection unit 101, and "three-phase driving voltage values" applied to respective coil terminals of the motor. The activation control unit 103 instructs the motor current detection unit 101 to detect motor currents, and instructs the motor speed estimation unit 102 to perform an estimation computation. The PI control unit 104 performs a proportional integral computation process based on the rotation speed of the motor which is estimated by the motor speed estimation unit 102. The PWM control unit 105 controls the pulse voltage to apply to each coil terminal of the motor 100 based on an instruction from the PI control unit 104.

Note that, here, it is assumed that a processor (a CPU) executes a program to realize the SFOC unit by software. However, configuration may be taken such that some or all of the motor control unit 200 is realized by hardware such as an FPGA or a custom LSI.

Figure 2:
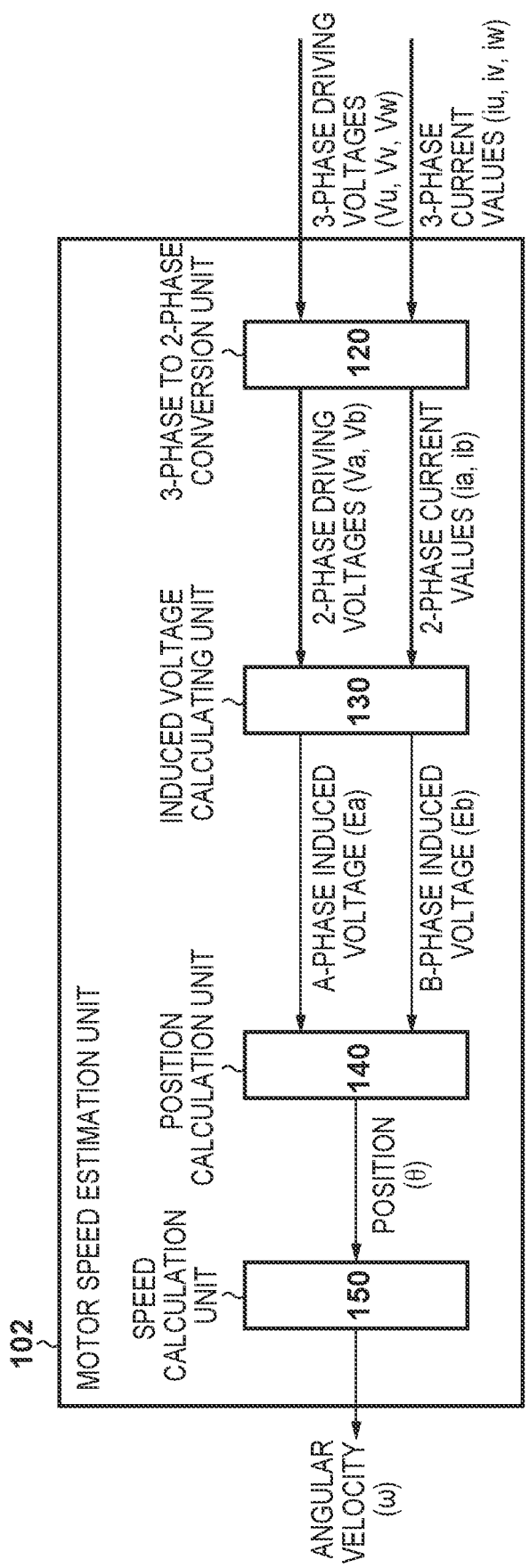
FIG. 2 is a detailed block diagram of a motor speed estimation unit.

FIG. 2 is a detailed block diagram of the motor speed estimation unit 102. The motor speed estimation unit 102 includes a three-phase to two-phase conversion unit 120, an induced voltage calculating unit 130, a position calculation unit 140, and a speed calculation unit 150.

The three-phase to two-phase conversion unit 120 takes as inputs three-phase current values (iu, iv, and iw) which are detected by the motor current detection unit 101, and three-phase driving voltage values (Vu, Vv, and Vw) which are outputted by the PWM control unit 105, and outputs each of these after converting them to two-phase components. Let results of conversion to two-phase components be respectively two-phase driving voltages (Va and Vb), and two-phase current values (ia and ib).

The induced voltage calculating unit 130 calculates an A-phase induced voltage (Ea) and a B-phase induced voltage (Eb) from the two-phase driving voltages (Va, Vb) and the two-phase current values (ia, ib). These are specifically as follows when represented by equations.

$$Ea = Va - R \times ia - L \times dia/dt$$

$$Eb = Vb - R \times ib - L \times dib/dt$$

Here, R is a winding resistance and L is a winding inductance, and it is assumed that each has a specific value. In addition, dia/dt and dib/dt indicate rates of current change over a certain amount of time.

The position calculation unit 140 obtains an arctangent with respect to a ratio of the A-phase induced voltage (Ea) and the B-phase induced voltage (Eb) to thereby calculate a position (θ). This is specifically as follows when represented by an equation.

$$\theta = \tan^{-1}(-Eb/Ea)$$

The speed calculation unit 150 obtains a rate of change of the position (θ) in a certain amount of time to calculate a speed estimation value (ω). This is specifically as follows when represented by an equation.

$$\omega = d\theta/dt$$

Figure 3:
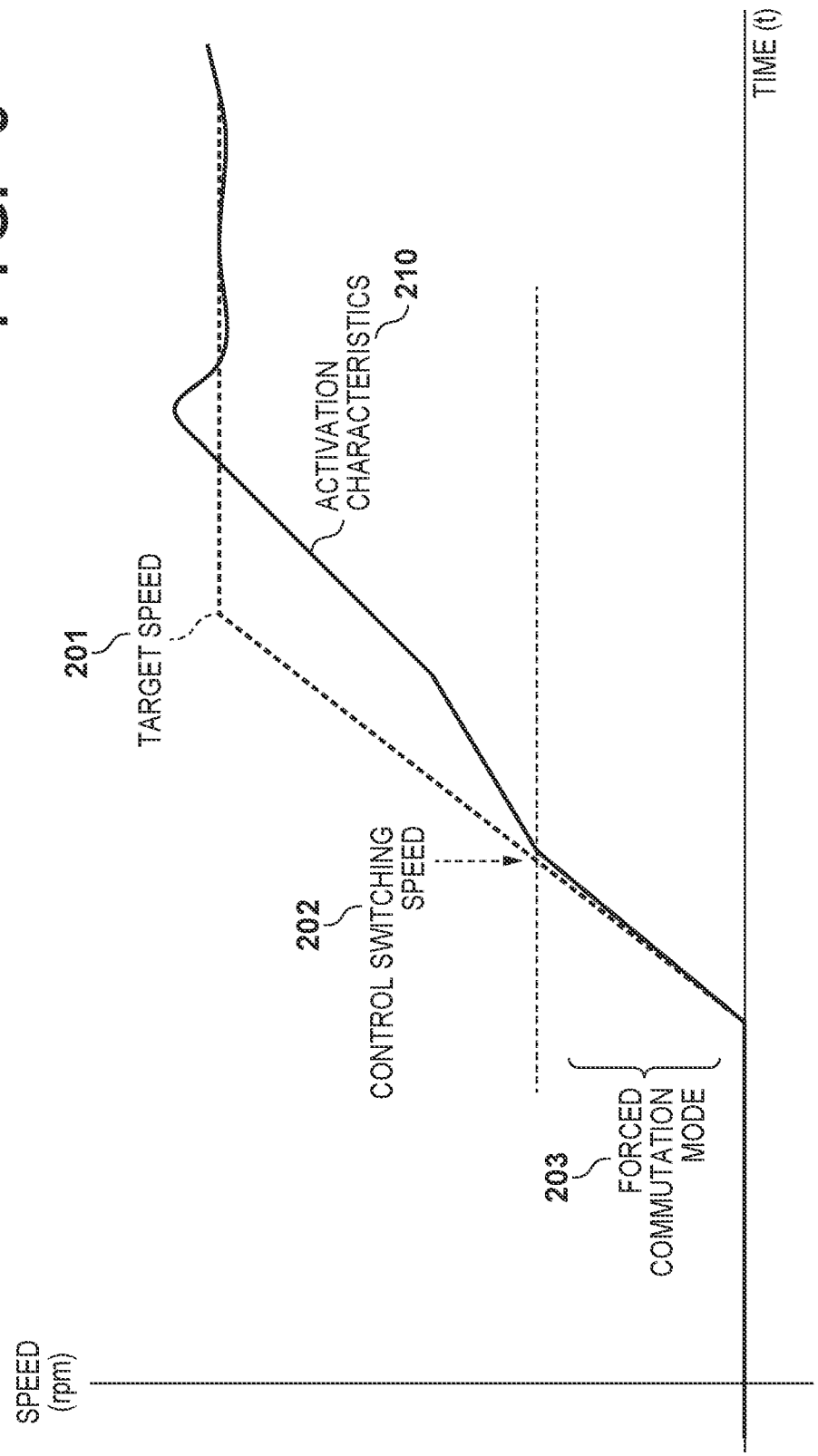
FIG. 3 is a view that exemplarily illustrates change of the rotation speed of a motor when there is a transition from forced commutation to SFOC.

FIG. 3 is a view that exemplarily illustrates change of the rotation speed of a motor when there is a transition from forced commutation to SFOC. Specifically, illustration is given for the rotation speed of the motor 100 with a conventional technique for simply switching from control in accordance with a forced commutation mode (forced commutation control) to SFOC. The abscissa indicates time (t), and the ordinate indicates a motor rotation speed (rpm).

At a time of activation, the motor is first driven from a speed of 0 (zero) in a forced commutation mode 203 until a predetermined threshold speed. In FIG. 3, the predetermined threshold speed is a control switching speed 202. Once the motor reaches the predetermined speed, the control switches from forced commutation control to SFOC. Subsequently, once the speed of the motor reaches a target speed 201, an acceleration command is suspended. Subsequently, the motor continues to be driven at a fixed speed until the target speed is changed.

A brief description is given regarding control in accordance with the forced commutation mode which was referred to as a background technique. The forced commutation mode is a method for applying voltages to each phase of a motor by open loop control. Because the forced commutation mode has large current consumption, using it for too long is not desirable. Consequently, at a time of activation, switching from the forced commutation mode to SFOC, which has good power efficiency, as early as possible is desirable. However, immediately after switching from the forced commutation mode to SFOC, there is typically a large error in a speed estimate. Accordingly, it takes time for the motor speed to converge to the target speed as indicated by the curve of an activation characteristic 210.

In view of this, in the first embodiment, consideration is given to quickly reducing error in a speed estimate by increasing an execution frequency of a speed estimate (and current detection necessary for a speed estimate) immediately after the switch to SFOC.

Figure 4:
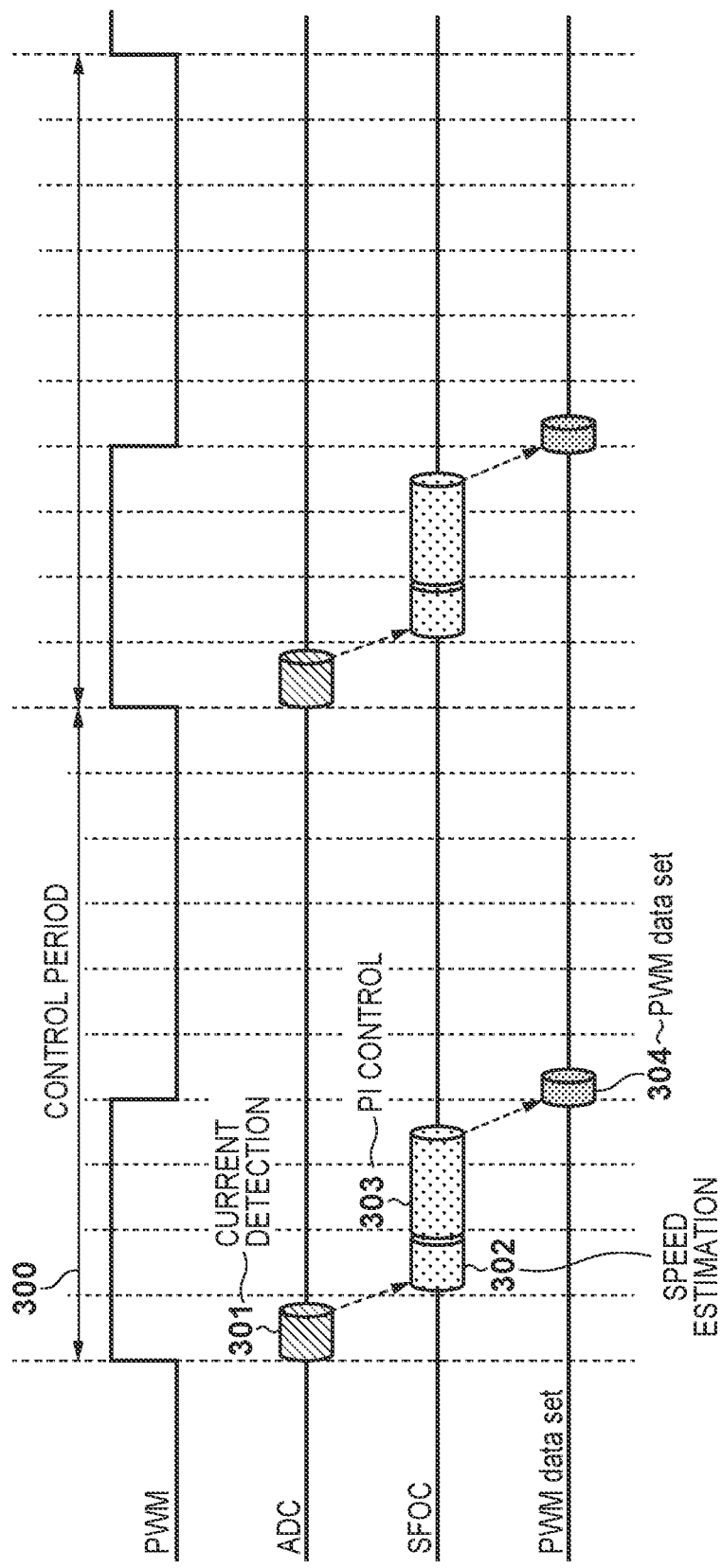
FIG. 4 is a view illustrating process timings in SFOC in a steady state.

FIG. 4 is a view illustrating process timings in SFOC in a steady state. A steady state is a state where the motor 100 is stably operating at the target speed 201, for example. Here process timings for two PWM control periods are illustrated.

Note that, in FIG. 4, "PWM" indicates a process for a DC-AC conversion in order to supply a current to the motor. "ADC" indicates an analog to digital conversion process for detecting a motor current. "SFOC" indicates something for motor control. For example, control for processes for a reverse coordinate conversion (a stationary coordinate conversion and a two-phase to three-phase conversion), current control, speed control, speed estimation, and coordinate conversions (a three-phase to two-phase conversion and a rotation coordinate conversion) which are necessary for sensorless vector control are executed. "PWM data set" indicates a PWM data output process.

Firstly, a current detection process 301 is performed by the motor current detection unit 101. Next, the motor speed estimation unit 102 performs a motor speed estimation process 302 for estimating a speed of the motor based on detected current values. Subsequently, the PI control unit 104 performs a PI control process 303 based on the estimated speed, and performs a PWM data output process 304 for outputting data based on a PI control result to the PWM control unit 105.

Figure 5:
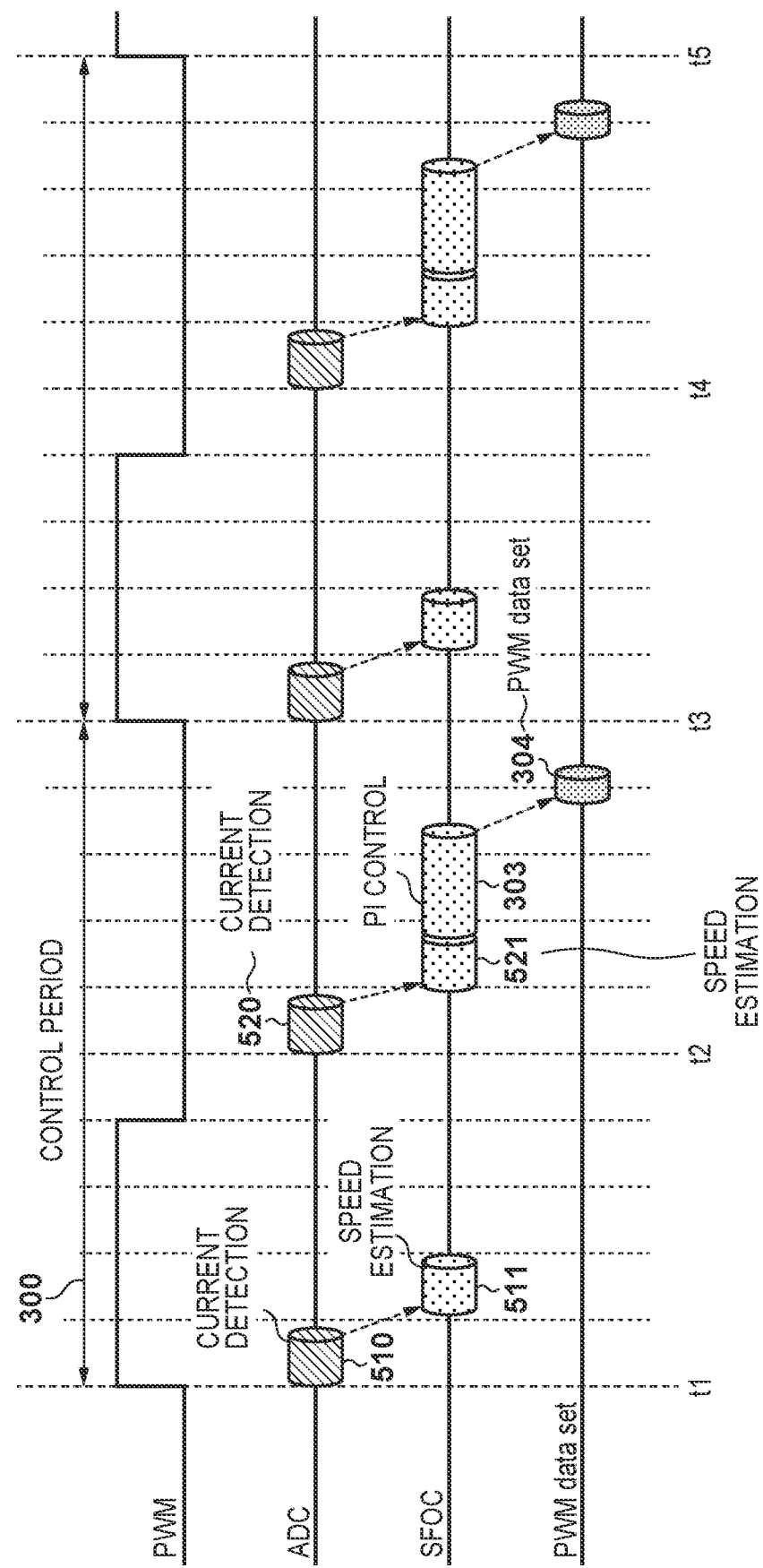
FIG. 5 is a view illustrating process timings immediately after switching to SFOC.

FIG. 5 is a view illustrating process timings for SFOC immediately after switching to SFOC. As described above, operations illustrated in FIG. 5 are specific to the first embodiment. In FIG. 4, the current detection process 301 and the motor speed estimation process 302 are each executed once in one control period. In contrast, in FIG. 5, the current detection process 301 and the motor speed estimation process 302 are each executed twice in one control period.

Firstly, a current detection process 510 is performed by the motor current detection unit 101 at a time t1. Next, the motor speed estimation unit 102 performs a motor speed estimation process 511 for estimating a speed (ω1) of the motor based on detected current values.

Subsequently, a current detection process 520 is performed by the motor current detection unit 101 at a time t2. Next, the motor speed estimation unit 102 performs a motor speed estimation process 521 for estimating a speed (ω2) of the motor based on detected current values. Subsequently, the PI control unit 104 performs a PI control process 303 based on the estimated speed (ω2), and performs a PWM data output process 304 for outputting data based on a PI control result to the PWM control unit 105.

Note that, although an example of doubling the frequency of current detection and a speed estimation computation has been given in the above description, it is possible to further increase the execution frequency of current detection and speed estimation within a range where the PWM data output process 304 can complete before the next control period starts.

Figure 6:
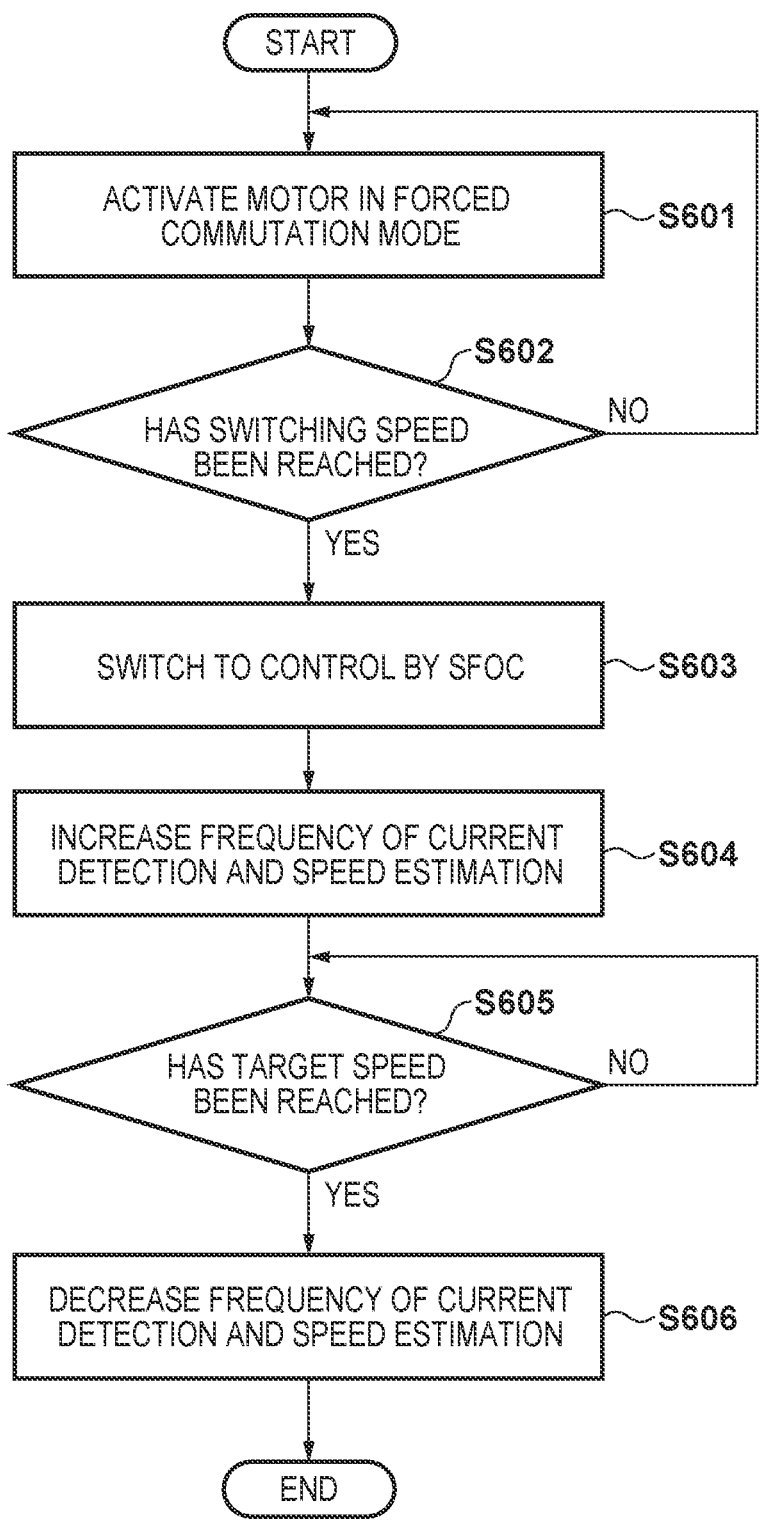
FIG. 6 is a flowchart of a control mode switch process.

FIG. 6 is a flowchart of a control mode switch process in the first embodiment. In step S601, the integrated control unit 110 starts motor control in accordance with the forced commutation mode. In addition, the integrated control unit 110 starts obtainment of the rotation speed of the motor 100. Note that the rotation speed of the motor 100 may be obtained by causing the motor speed estimation unit 102 of the SFOC unit to operate, and may be obtained by using a separate encoder. In step S602, the integrated control unit 110 determines whether the rotation speed of the motor 100 has reached the speed for switching to SFOC (the control switching speed 202), and advances to step S603 if the speed for switching is reached.

In step S603, the integrated control unit 110 switches to motor control in accordance with SFOC. In step S604, the integrated control unit 110 increases the frequency of current detection and speed estimation. For example, control is performed in order to perform current detection and speed estimation twice in one control period.

In step S605, the integrated control unit 110 determines whether the rotation speed of the motor 100 has reached the target speed 201, and advance to step S606 if the target speed 201 has been reached. In step S606, the integrated control unit 110 reduces the frequency of current detection and speed estimation. For example, control is performed in order to perform current detection and speed estimation once in one control period.

Figure 7:
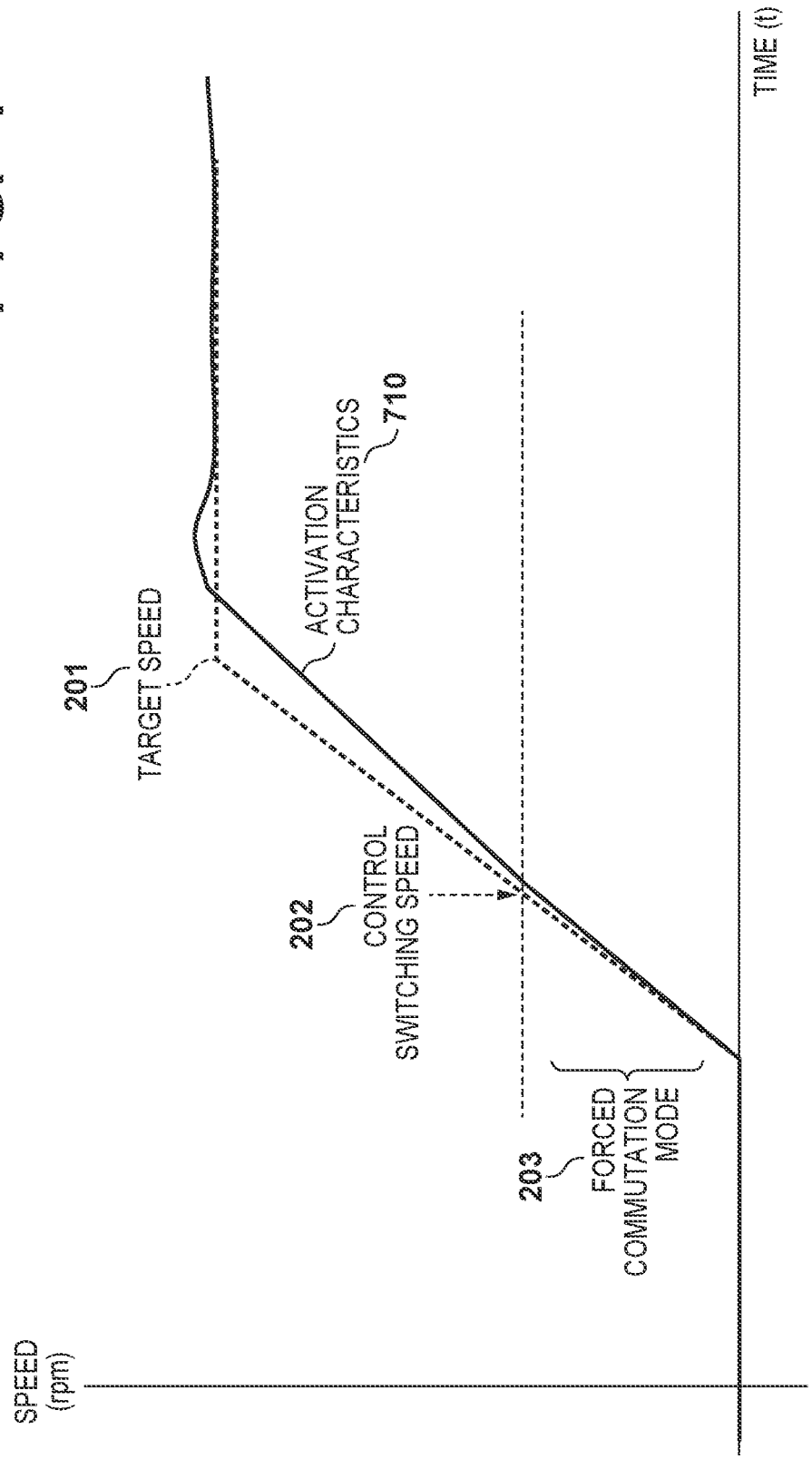
FIG. 7 is a view that exemplarily illustrates an effect of a control mode switch process.

FIG. 7 is a view that exemplarily illustrates an effect of the control mode switch process. Specifically, the rotation speed of the motor 100 is illustrated for a case where the control illustrated in FIG. 5 is performed after the start of control in accordance with SFOC (after the control switching speed 202 is reached), in contrast to FIG. 3. Similarly to FIG. 3, the abscissa indicates time (t), and the ordinate indicates a motor speed (rpm).

At a time of activation, the motor 100 is first driven from a speed of 0 (zero) in the forced commutation mode 203 until a predetermined speed. Once the motor reaches the control switching speed 202 which is a predetermined threshold speed, control switches from the forced commutation mode to SFOC. Immediately after the control switches to SFOC, the frequency of current detection and speed estimation increases as illustrated by FIG. 5. Because of this, a difference with the target speed is corrected in a time interval shorter than a control period. As a result, speed tracking performance with respect to the target speed 201 improves as indicated by the curve of an activation characteristic 710. Subsequently, once the speed of the motor reaches the target speed 201, an acceleration command is suspended. In addition, the frequency of current detection and speed estimation decreases as illustrated by FIG. 4. Subsequently, the motor continues to be driven at a fixed speed until the target speed is changed.

By virtue of the first embodiment as described above, in motor control, motor driving in accordance with the forced commutation mode is performed at a time of activation, and then motor driving in accordance with SFOC is switched to. In addition, immediately after switching to SFOC, the execution frequency of current detection and speed estimation is increased. By this, it is possible to decrease an estimation error for a motor speed immediately after a switch to SFOC, and it is possible to shorten an activation time while realizing stable motor control.

(Variation)

In the first embodiment as described above, there is a configuration for switching to control in accordance with SFOC, triggered by the rotation speed of the motor reaching a predetermined threshold speed, but control in accordance with SFOC may be switched to based on another trigger. For example, configuration may be taken to switch to SFOC after the passage of a first time period (for example, a predetermined number of control periods) after the start of control of the motor.

In addition, in the first embodiment as described above, configuration is such that the execution frequency of the current detection and speed estimation is decreased, triggered by the rotation speed of the motor reaching the target speed, but the execution frequency of the current detection and speed estimation may be decreased based on another trigger. For example, configuration may be taken to decrease the frequency of current detection and speed estimation in a third time period following after the passage of a second time period (for example, a predetermined number of control periods) after the transition to SFOC. It is sufficient if the frequency of current detection and speed estimation is increased in at least one control period immediately after the switch to SFOC.

In addition, although description was given regarding an example of performing current detection and speed estimation twice in one control period immediately after switching to SFOC, but these may be performed N times (N is an integer greater than or equal to 2). In such a case, configuration may be taken to gradually reduce the number of times these are performed in one control period. For example, configuration may be taken to execute these three times a control period immediately after transitioning to control in accordance with SFOC, reduce execution to two times a control period after the passage of a predetermined amount of time, and reduce execution to once per control period after the target speed is reached.

Second Embodiment

In the first embodiment, a setting is such that the execution frequency of the current detection and speed estimation is increased immediately after switching to SFOC, and the execution frequency of current detection and speed estimation is returned to an original value after the target speed is reached. In the second embodiment, description is given regarding an example for performing control, of the execution frequency of current detection and speed estimation immediately after switching to SFOC, in accordance with the status of another engine control process.

For this other engine control process, consideration can be given to, for example, a process for controlling various processes such as charging, exposure, development, transfer, and fixing in a laser beam printer. These engine control processes are performed asynchronously with an SFOC control period, and are control having a property that it is sufficient if they are completely performed within a predetermined amount of time after certain trigger (for example, an interrupt notification indicating that a conveyed sheet has reached a predetermined position).

Note that when an engine control process and an SFOC process are performed by one CPU, processing is performed by dividing an amount of time and time-divisionally switching. An engine control process is managed and performed by the integrated control unit 110, similarly to for SFOC.

Figure 8:
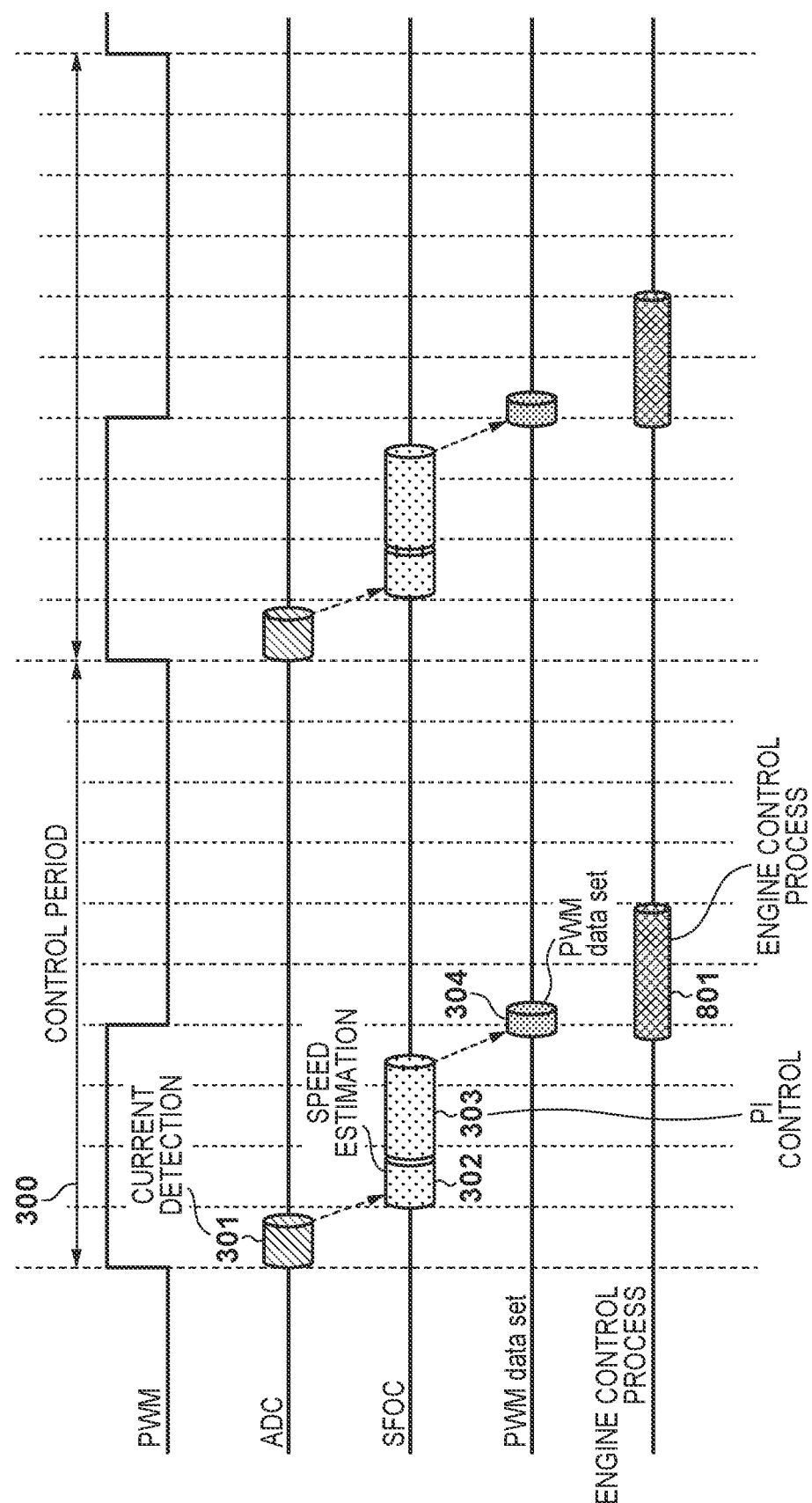
FIG. 8 is a view illustrating process timings for SFOC and engine control in a steady state.

FIG. 8 is a view illustrating process timings for SFOC and engine control in a steady state. A steady state is a state where the motor 100 is stably operating at the target speed 201, for example. Here, similarly to FIG. 4, process timings for two PWM control periods are illustrated.

The current detection process 301, the motor speed estimation process 302, the PI control process 303, and the PWM data output process 304 are similar to in FIG. 4, and description thereof is omitted.

An "engine control process" indicates, for example, a process for controlling various processes in a laser beam printer, as described above, and an engine control process 801 is performed in a control period 300.

In addition, a processing time and performance of an "engine control process" is managed by the integrated control unit 110, and is performed in parallel with the PWM data output process 304. Although an "engine control process" is managed and performed by the integrated control unit 110, because a "PWM data output process" is managed and performed by a PWM module (hardware), it is possible for these processes to proceed in parallel.

Figure 9:
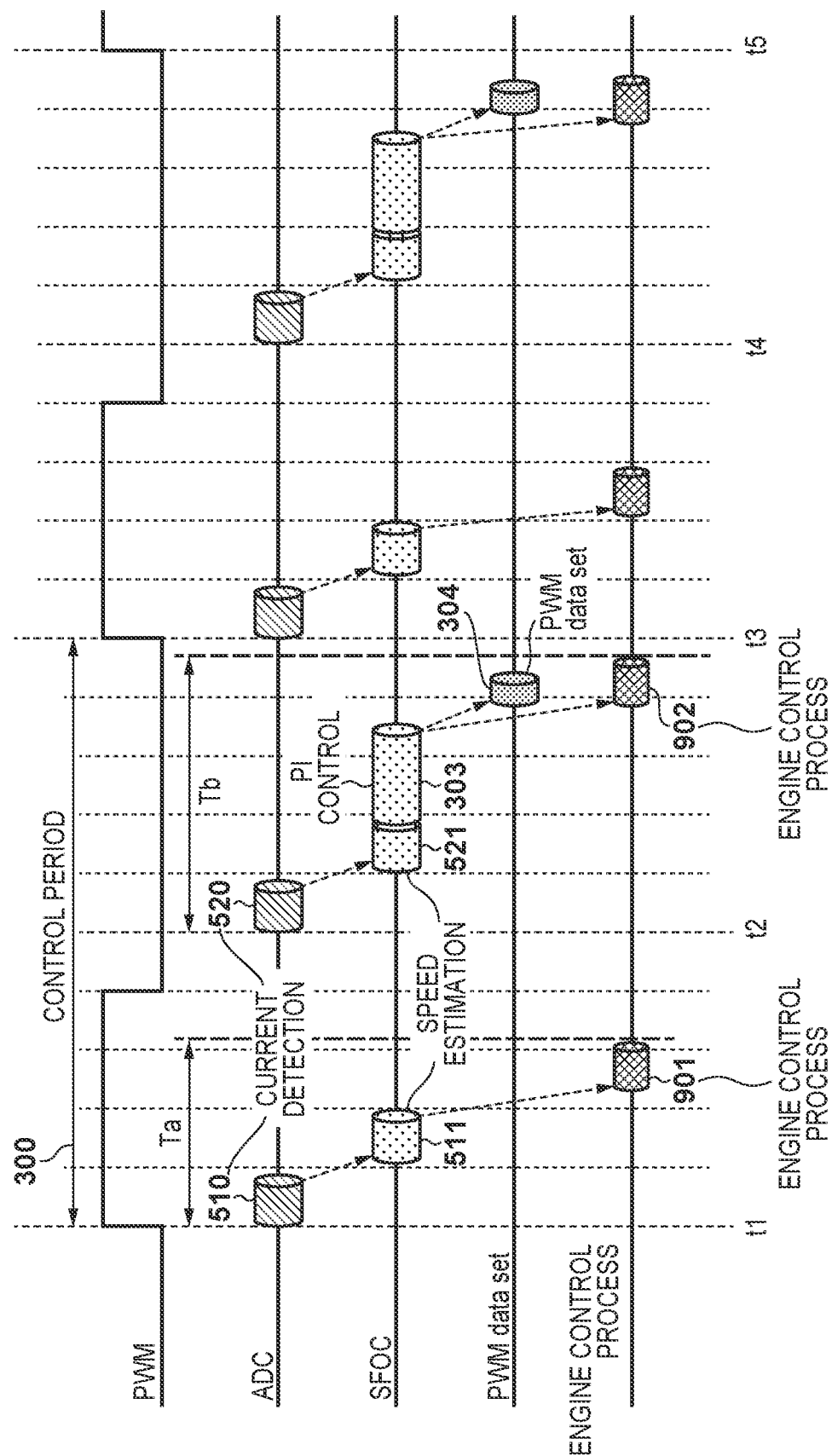
FIG. 9 is a view illustrating process timings for SFOC and engine control immediately after switching to SFOC.

FIG. 9 is a view for illustrating process timings for SFOC and engine control immediately after switching to SFOC. In FIG. 8, a current detection process and a motor speed estimation process are each executed once in one control period. In contrast, in FIG. 9, a current detection process and a motor speed estimation process are each executed twice in one control period.

Firstly, initially a determination is made as to whether it is possible to increase the frequency of current detection and speed estimation computation in the control period 300, at a time t1. As criteria for the determination, for example, firstly it is determined whether or not there is engine control that should be performed in the control period 300, and if there is, processing time for an engine control process that should be controlled is predicted and divided, and it is determined whether it is also possible to perform a divided engine control process 902 even if the frequency of a current detection process and a motor speed estimation process in one control period is increased. In addition, if there is no engine control that should be controlled in the control period 300, it is determined whether the PWM data output process 304 can also be performed even if the frequency of the current detection process and the motor speed estimation process in one control period is increased similarly to in the first embodiment.

If there is engine control that should be performed in the control period 300, when a determination as to whether it is possible to increase the frequency of a current detection process and a motor speed estimation process is represented by an equation, it is as follows, for example.

Letting Ta be a total expected processing time of current detection 510, speed estimation 511, and a divided engine control process 901 (because this is predicted from the immediately previous control period or a history of a fixed period, it will not be underestimated), and letting Tb be a total expected processing time of current detection 520, speed estimation 521, PI control 303, and the one of the divided engine control process 902 and the PWM data output process 304 having the longer processing time (because this is predicted from the immediately previous control period or a history of a fixed period, it will not be underestimated):

$$(t2-t1) > Ta \tag{1}$$

$$(t3-t2) > Tb \tag{2}$$

It is a condition of being able to increase the frequency of current detection and speed estimation computation that Equation (1) and Equation (2) hold true simultaneously. Configuration may be taken to, if one out of Equation (1) and Equation (2) does not hold true, adjust a division ratio between the engine control process 901 and the engine control process 902 such that Equation (1) and Equation (2) hold true. (FIG. 9 illustrates an example where it is determined that it is possible to increase the frequency of the current detection process and the motor speed estimation process, and current detection and speed estimation computation are performed twice in one control period.)

Description is given in order for processing after the determination described above.

Firstly, a current detection process 510 is performed by the motor current detection unit 101. Next, the motor speed estimation unit 102 performs a motor speed estimation process 511 for estimating a speed ($\omega$1) of the motor based on detected current values. Once the motor speed estimation process 511 ends, the divided engine control process 901 is performed.

Subsequently, the motor current detection unit 101 performs a current detection process 520 at a time t2. Next, the motor speed estimation unit 102 performs a motor speed estimation process 521 for estimating a speed ($\omega$2) of the motor based on detected current values. Subsequently, the PI control unit 104 performs a PI control process 303 based on the estimated speed ($\omega$2), and performs a PWM data output process 304 for outputting data based on a PI control result to the PWM control unit 105. In addition, the other divided engine control process 902 is performed in parallel with the PWM data output process 304. (As already described, it is possible to perform an engine control process and a PWM data output process in parallel.)

Note that, although description was given for an example of doubling the frequency of current detection and speed estimation computation in the above description, before the next control period starts, it is also possible to increase the execution frequency of current detection and speed estimation in a range where completion is possible for whichever out of a divided engine control process and the PWM data output process 304 has a longer processing time.

Figure 10:
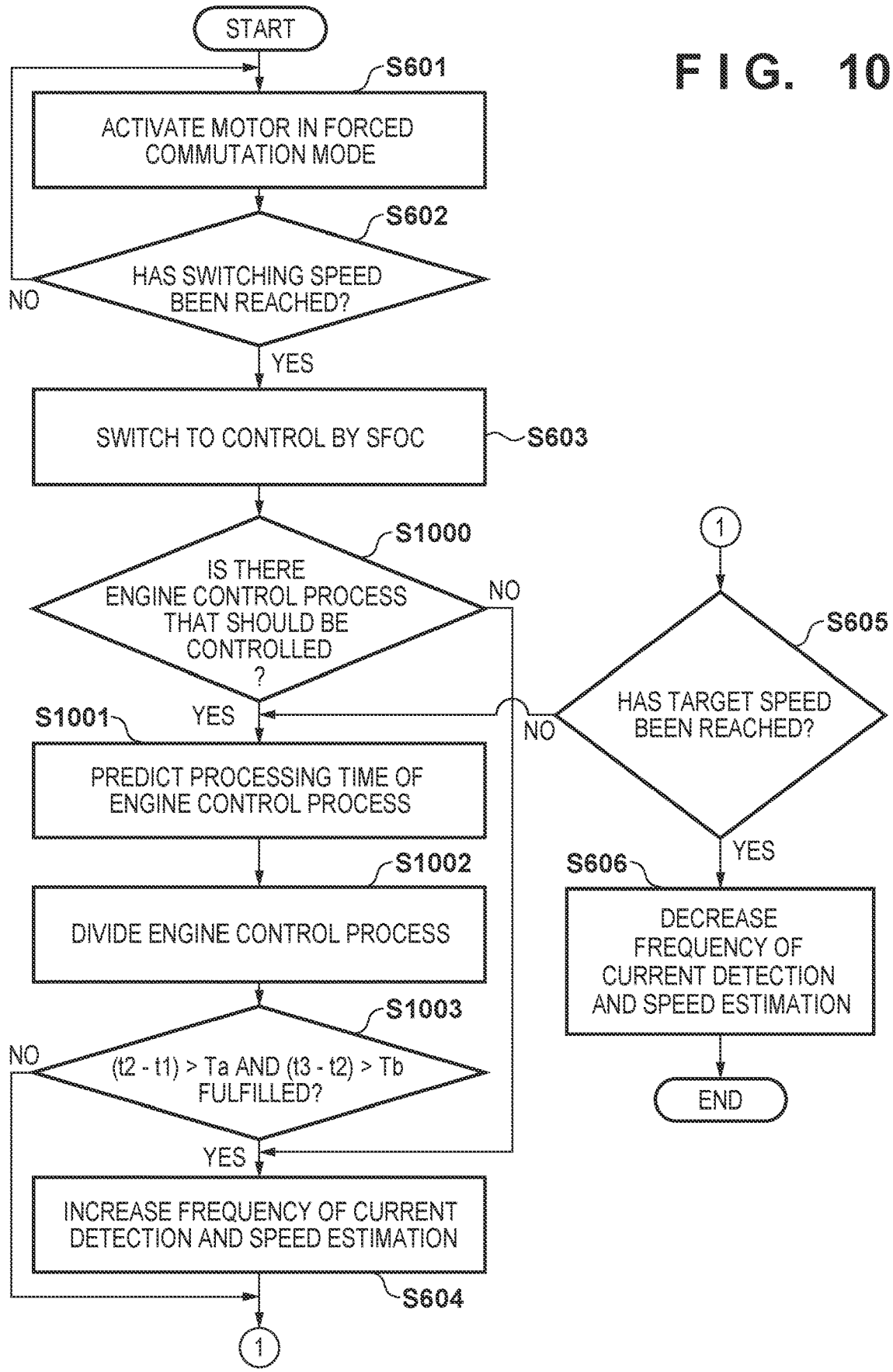
FIG. 10 is a flowchart of a control mode switch process in a second embodiment.

FIG. 10 is a flowchart of a control mode switch process in the second embodiment. Steps S601 to S603 are similar to those in FIG. 6, and thus description thereof is omitted.

In step S1000, at t1 of FIG. 9, the integrated control unit 110 determines whether or not there is an engine control process that should be controlled in the control period 300.

If there is the processing advances to step S1001, and if not the processing advances to step S604.

In step S1001, at t1 of FIG. 9, the integrated control unit 110 predicts the processing time of an engine control process that should be controlled in the control period 300. As a method of predicting the processing time, the processing time may be predicted based on processing performed in the immediately previous control period, and the processing time may be predicted based on processing performed in control periods for a fixed period of time. Because this is predicted from the immediately previous control period or a history of a fixed period, it will not be underestimated.

In step S1002, the integrated control unit 110 divides the predicted engine control process. A method of dividing the engine control process may be equal division, and it may be unequal division in alignment with the priority of processing in the control period 300. In addition, configuration may be taken to not perform division.

In addition, there may be a method for, immediately after switching to SFOC, reducing the priority of an engine control process to intentionally shorten the processing time corresponding to an engine control process. In addition, as described above, configuration may be taken to, if one out of Equation (1) and Equation (2) does not hold true, adjust a division ratio between the engine control process 901 and the engine control process 902 such that Equation (1) and Equation (2) hold true.

In step S1003, the integrated control unit 110 determines whether it is possible to increase the frequency of current detection and speed estimation computation. Specifically, that the foregoing Equation (1) and Equation (2) hold true simultaneously is a condition of being able to increase the frequency of current detection and speed estimation computation. If this condition holds true the processing proceeds to step S604, and if this condition does not hold true the processing advances to step S605. Subsequent steps S604 to S606 are similar to those in FIG. 6, and thus description thereof is omitted.

Note that, if it is determined at the time t1 that it is not possible to increase the frequency of the current detection and speed estimation computation, the process timing illustrated in FIG. 8 occurs.

By virtue of the second embodiment as described above, in motor control, motor driving in accordance with the forced commutation mode is performed at a time of activation, and then motor driving in accordance with SFOC is switched to. In particular, by performing, in accordance with the status of another engine control process, control of the execution frequency of current detection and speed estimation immediately after switching to SFOC, it is possible to efficiently change the execution frequency of current detection and speed estimation even if the SFOC process and the other engine control process are performed by one CPU.

By this, it is possible to reduce an estimation error for a motor speed immediately after a switch to SFOC, and it is possible to shorten an activation time while realizing stable motor control.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-076244, filed Apr. 11, 2018, and No. 2019-060572, filed Mar. 27, 2019, which are hereby incorporated by reference herein in their entirety.

What is claimed is:

1. A motor control apparatus operable to control a motor, the apparatus comprising:
   a detection unit configured to detect a current supplied to the motor;
   an estimation unit configured to estimate a rotation speed of the motor from the current detected by the detection unit;
   a first driving unit configured to drive the motor by forced commutation control;
   a second driving unit configured to drive the motor by vector control based on the rotation speed of the motor which is estimated by the estimation unit;
   a first control unit configured to control so as to drive the motor by the first driving unit in a duration from a start of control of the motor until a first time period elapses, and control so as to drive the motor by the second driving unit after the first time period has elapsed; and
   a second control unit configured to control an execution frequency of the detection unit and the estimation unit, wherein
   the second control unit controls so that, regarding an execution frequency of detection by the detection unit and estimation by the estimation unit, a first execution frequency in a second time period after a switch is made from driving by the first driving unit to driving by the second driving unit is greater than a second execution frequency in a third time period subsequent to the second time period.

2. The motor control apparatus according to claim 1, wherein
   the first time period is a time period from the start of control of the motor until the rotation speed of the motor reaches a predetermined threshold speed.

3. The motor control apparatus according to claim 1, wherein
the second time period is a time period from the switch to driving by the second driving unit until the rotation speed of the motor reaches a target speed.

4. The motor control apparatus according to claim 1, wherein
the third time period is a time period in which the motor is rotating at a target speed.

5. The motor control apparatus according to claim 1, wherein
the second driving unit performs the vector control in accordance with a difference between the rotation speed of the motor which is estimated by the estimation unit, and a target speed.

6. The motor control apparatus according to claim 1, wherein
the first execution frequency is a frequency of N times (N is an integer greater than or equal to 2) in one control period for the second driving unit, and
the second execution frequency is a frequency of once in one control period for the second driving unit.

7. The motor control apparatus according to claim 1, wherein
the second control unit, in the second time period, determines whether to increase the first execution frequency based on a load status of processing other than the vector control.

8. The motor control apparatus according to claim 1, wherein
the second control unit, in the second time period, increases the first execution frequency by increasing a priority of the vector control to be higher than a priority of processing other than the vector control.

9. A method of controlling a motor control apparatus operable to control a motor,
the motor control apparatus comprising:
a detection unit configured to detect a current supplied to the motor;
an estimation unit configured to estimate a rotation speed of the motor from the current detected by the detection unit;
a first driving unit configured to drive the motor by forced commutation control; and
a second driving unit configured to drive the motor by vector control based on the rotation speed of the motor which is estimated by the estimation unit, and
the method comprising:
performing a first control for controlling to drive the motor by the first driving unit in a duration from a start of control of the motor until a first time period elapses, and controlling to drive the motor by the second driving unit after the first time period has elapsed; and
performing a second control for controlling such that, regarding an execution frequency of detection by the detection unit and estimation by the estimation unit, a first execution frequency in a second time period after a switch is made from driving by the first driving unit to driving by the second driving unit is greater than a second execution frequency in a third time period subsequent to the second time period.

10. The method according to claim 9, wherein
the first time period is a time period from the start of control of the motor until the rotation speed of the motor reaches a predetermined threshold speed.

11. The method according to claim 9, wherein
the second time period is a time period from the switch to driving by the second driving unit and until the rotation speed of the motor reaches a target speed.

12. The method according to claim 9, wherein
the third time period is a time period in which the motor is rotating at a target speed.

13. The method according to claim 9, wherein
the second driving unit performs the vector control in accordance with a difference between the rotation speed of the motor which is estimated by the estimation unit, and a target speed.

14. The method according to claim 9, wherein
the first execution frequency is a frequency of N times (N is an integer greater than or equal to 2) in one control period for the second driving unit, and
the second execution frequency is a frequency of once in one control period for the second driving unit.

15. The method according to claim 9, wherein
the second control unit, in the second time period, determines whether to increase the first execution frequency based on a load status of processing other than the vector control.

16. The method according to claim 9, wherein
the second control unit, in the second time period, increases the first execution frequency by increasing a priority of the vector control to be higher than a priority of processing other than the vector control.

17. A non-transitory computer-readable recording medium storing a program that causes a computer to function as a motor control apparatus operable to control a motor, the apparatus comprising:
a detection unit configured to detect a current supplied to the motor;
an estimation unit configured to estimate a rotation speed of the motor from the current detected by the detection unit;
a first driving unit configured to drive the motor by forced commutation control;
a second driving unit configured to drive the motor by vector control based on the rotation speed of the motor which is estimated by the estimation unit;
a first control unit configured to control so as to drive the motor by the first driving unit in a duration from a start of control of the motor until a first time period elapses, and control so as to drive the motor by the second driving unit after the first time period has elapsed; and
a second control unit configured to control an execution frequency of the detection unit and the estimation unit,
wherein
the second control unit controls so that, regarding an execution frequency of detection by the detection unit and estimation by the estimation unit, a first execution frequency in a second time period after a switch is made from driving by the first driving unit to driving by the second driving unit is greater than a second execution frequency in a third time period subsequent to the second time period.

18. The medium according to claim 17, wherein
the first time period is a time period from the start of control of the motor until the rotation speed of the motor reaches a predetermined threshold speed.

19. The medium according to claim 17, wherein
the second time period is a time period from the switch to driving by the second driving unit until the rotation speed of the motor reaches a target speed.

20. The medium according to claim 17, wherein
the third time period is a time period in which the motor is rotating at a target speed.

\* \* \* \* \*